(12) United States Patent
Tang

(10) Patent No.: US 7,883,304 B2
(45) Date of Patent: Feb. 8, 2011

(54) AUTOMATIC BOTTOM LOCK

(75) Inventor: Changde Tang, Kunshan (CN)

(73) Assignee: Kunshan Lucky Sea Instudrial Co., Ltd., Lujia Town, Kunshan, Jiangsu Province (CN)

( * ) Notice: Subject to any disclaimer, the term of this patent is extended or adjusted under 35 U.S.C. 154(b) by 438 days.

(21) Appl. No.: 12/030,190

(22) Filed: Feb. 12, 2008

(65) Prior Publication Data

US 2009/0110506 A1     Apr. 30, 2009

(30) Foreign Application Priority Data

Oct. 31, 2007    (CN) .................. 2007 1 0134958

(51) Int. Cl.
    *B60P 7/13*      (2006.01)
    *B61D 45/00*     (2006.01)
(52) U.S. Cl. ....................................................... 410/76
(58) Field of Classification Search .................. 410/69, 410/76, 70, 72, 71, 80, 82
See application file for complete search history.

(56) References Cited

U.S. PATENT DOCUMENTS

| 5,106,247 | A | * | 4/1992 | Hove et al. ..................... 410/73 |
| 5,613,814 | A | * | 3/1997 | Jackson ........................ 410/70 |
| 7,114,898 | B2 | * | 10/2006 | Brewster ....................... 410/70 |

* cited by examiner

*Primary Examiner*—Glenn Dayoan
*Assistant Examiner*—SunSurraye Westbrook

(57) ABSTRACT

The present invention provides an automatic bottom lock comprises a lock base, and a lock body fastened above the lock base comprising a hook provided thereon having a transverse guiding slope extending forward and downwardly from a top at a front side of the hook, a hooking slope extending backward and downwardly from a lower end of the transverse guiding slope, a transverse sliding slope extending backward and downwardly from a top at a rear side of the hook, and a locating plane at the bottom of the lock body extending backward and downwardly from the transverse sliding slope, wherein the locating plane is vertical to the horizontal plane, and extends left and right along the lock body.

19 Claims, 15 Drawing Sheets ical application according to the above preferred embodiment of the present invention.

AUTOMATIC BOTTOM LOCK

BACKGROUND OF THE PRESENT INVENTION

1. Field of Invention

The present invention relates to a container connector, and more particularly to an automatic bottom lock for locking a container in multi-direction at the bottom.

2. Description of Related Arts

At present, during the conveying of the container, a bottom lock is always provided at the bottom of the container for locking the container and the carrier, so as to prevent the shift and overturn of the container during the conveying.

The present bottom lock of the container used in all kinds of conveyance has to be operated manually, which means when laying down, the container can not lock with the carrier automatically, and when lifting up, the container also can not unlock with the carrier automatically. This drawback directly affects a loading and unloading efficiency. Therefore, it is an advancement to develop an automatic bottom lock to load and unload the container efficiently.

The patent application CN200520075357.2, an automatic bottom lock of container for ship, discloses an automatic bottom lock of container, which comprises a lock base, a lock body provided on the lock base, wherein the lock base comprises a hook inclinedly extending backward and downwardly from a top at a back side and bottom portion of the lock body, forming a sixth guiding slope. This type of automatic bottom lock does not need to be operated manually, during the loading and unloading, so that the efficiency is dramatically increased. To further improve the competitive power of the product, the company staff develops a more advanced technique on the base of the present technique.

SUMMARY OF THE PRESENT INVENTION

A main object of the present invention is to provide an automatic bottom lock for locking a container in multi-direction at the bottom in a more reliable manner, so as to solve a deficiency problem of the present manual bottom lock.

Accordingly, in order to accomplish the above object, the present invention provides an automatic bottom lock comprises a lock base, and a lock body fastened above the lock base comprising a hook provided thereon having a transverse guiding slope extending forward and downwardly from a top at a front side of the hook, a hooking slope extending backward and downwardly from a lower end of the transverse guiding slope, a transverse sliding slope extending backward and downwardly from a top at a rear side of the hook, and a locating plane at the bottom of the lock body extending backward and downwardly from the transverse sliding slope, wherein the locating plane is vertical to the horizontal plane, and extends left and right along the lock body.

The hook has a groove indenting forward at a rear and middle part of the hook. The hook has a left longitudinal guiding slope extending leftward and downwardly from a top of the hook, and a right longitudinal guiding slope extending rightward and downwardly from a top of the hook. The lock body close to the lock base is becoming thinner from the bottom to an upper portion. The front side and rear side of the lock body project a projecting shadow on the lock base. The lock base has a plurality of protruding platforms at a lower portion of the lock base at left and right side of the lock body, wherein the protruding platforms extend transversely along the lock body. The lock base further has a locating hole at a lower portion of the lock base and through left and right side of the lock body.

The advantage of the present invention is that the present invention can automatically lock the container the carrier during the laying down the lifting up process of the container in multi-direction and a more reliable manner. More particularly, the locating plane can protect the container from overturn.

These and other objectives, features, and advantages of the present invention will become apparent from the following detailed description, the accompanying drawings, and the appended claims.

DETAILED DESCRIPTION OF THE PREFERRED EMBODIMENT

Figure 1:
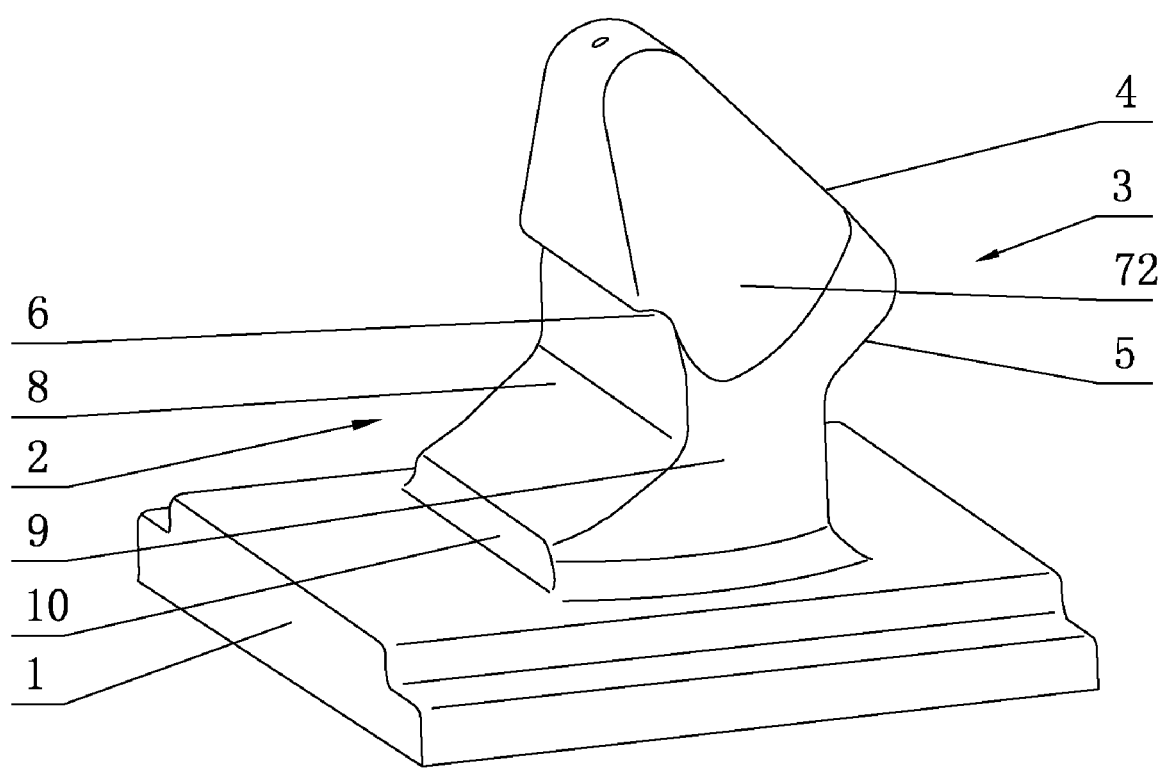
FIG. 1 is a perspective view of an automatic bottom lock according to a preferred embodiment of the present invention.
Figure 2:
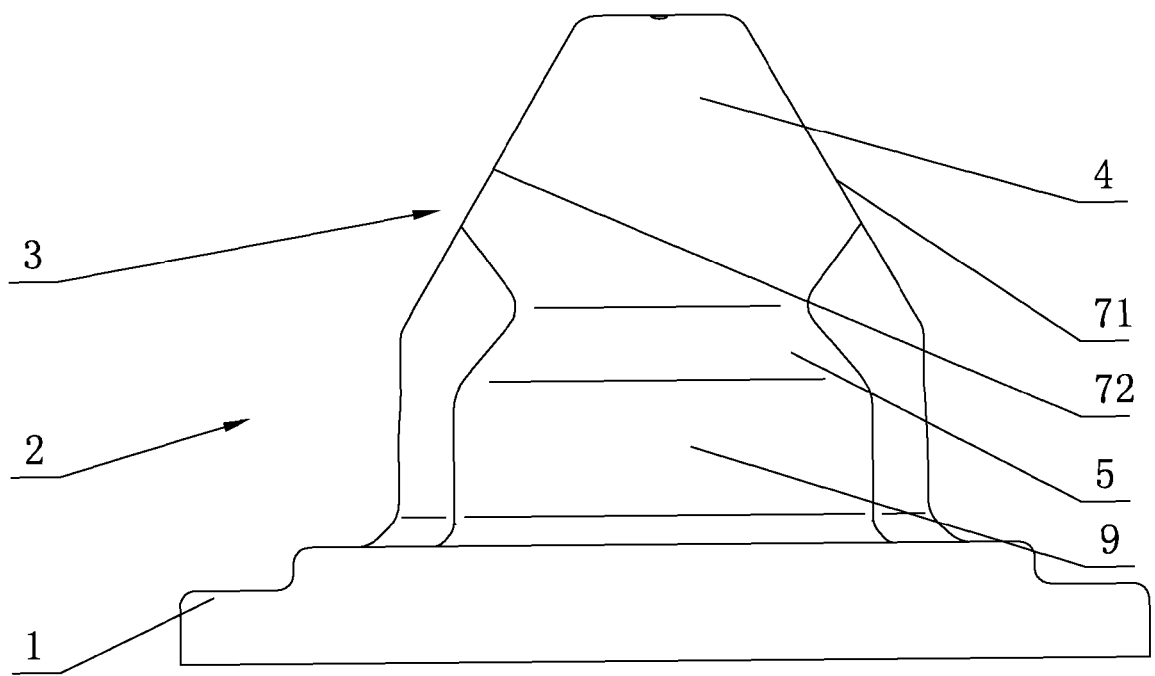
FIG. 2 is a front view of an automatic bottom lock according to the above preferred embodiment of the present invention.
Figure 3:
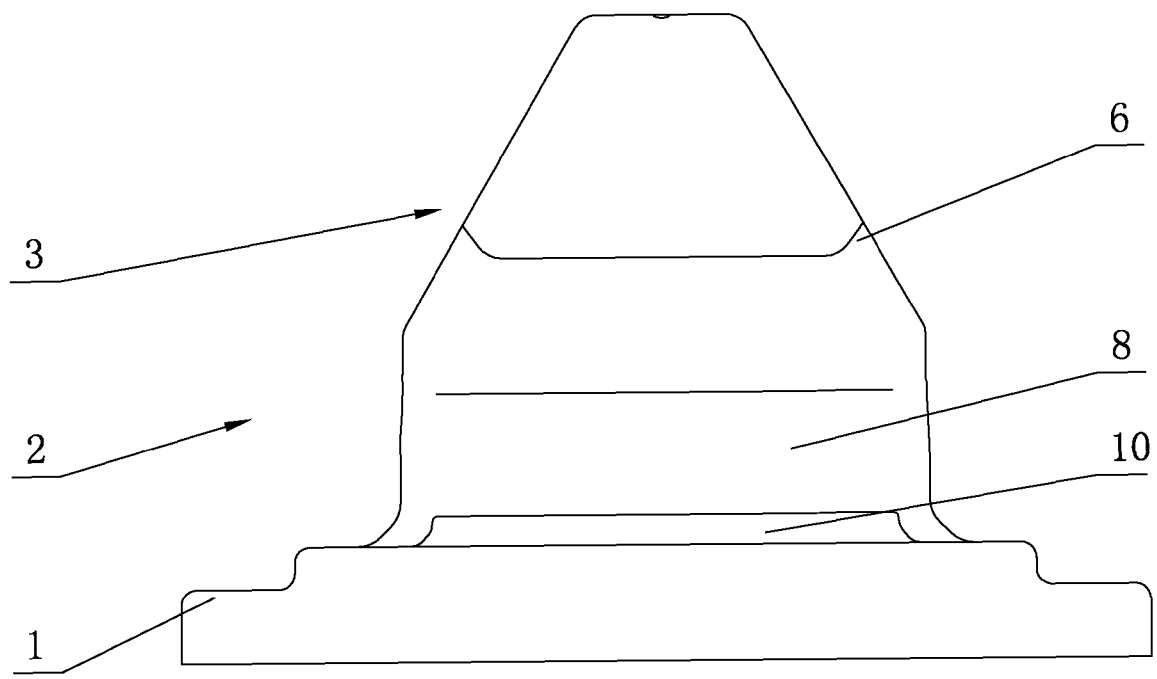
FIG. 3 is a rear view of an automatic bottom lock according to the above preferred embodiment of the present invention.
Figure 4:
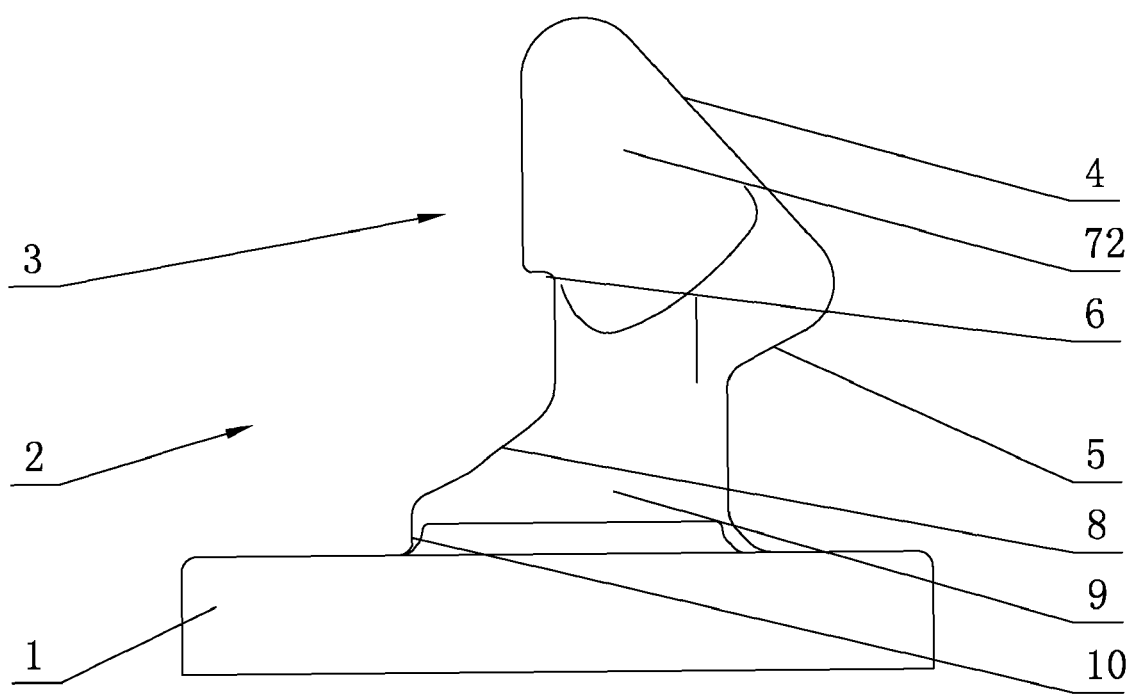
FIG. 4 is a left side view of an automatic bottom lock according to the above preferred embodiment of the present invention.
Figure 5:
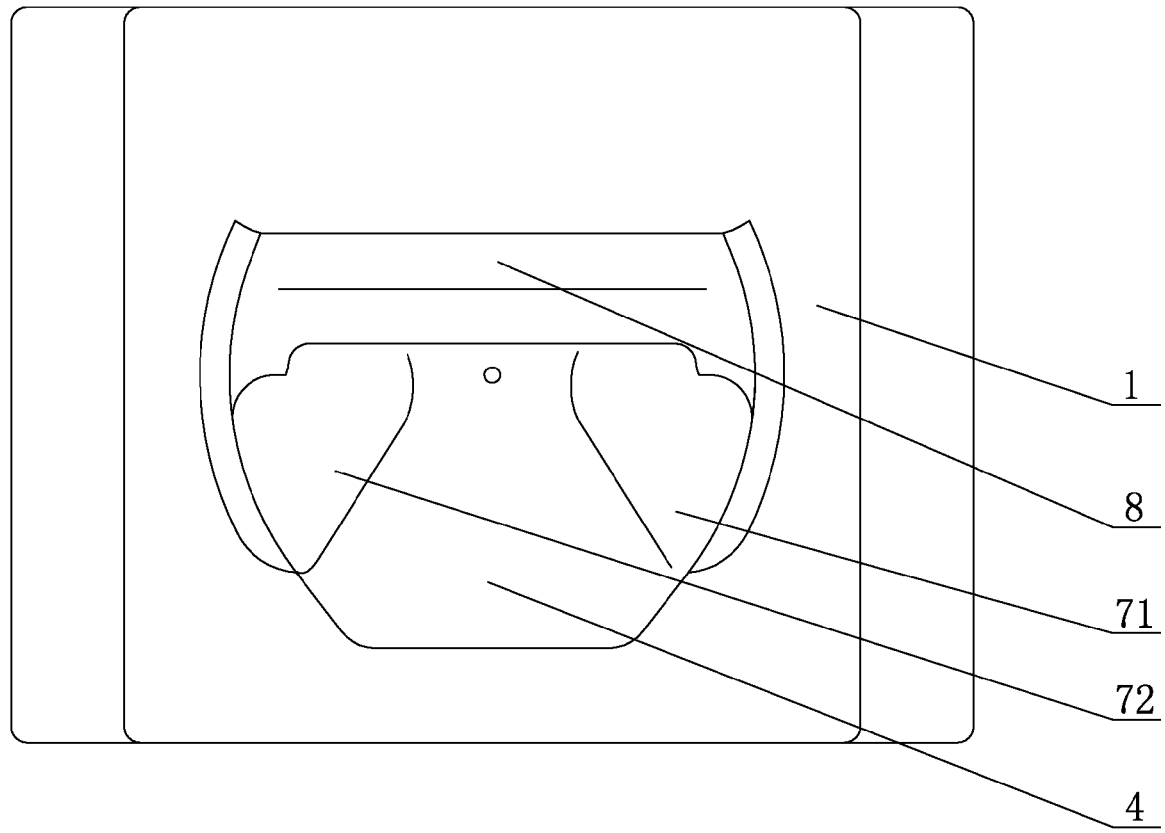
FIG. 5 is a top exterior view of an automatic bottom lock according to the above preferred embodiment of the present invention.

Referring to FIG. 1 through FIG. 5 of the drawings, an automatic bottom lock according to a preferred embodiment of the present invention is illustrated. The automatic bottom lock comprises a lock base 1, and a lock body 2 fastened above the lock base 1 comprising a hook provided thereon having a transverse guiding slope 4 extending forward and downwardly from a top at a front side of the hook, a hooking slope 5 extending backward and downwardly from a lower end of the transverse guiding slope 4, a transverse sliding slope 8 extending backward and downwardly from a top at a rear side of the hook, and a locating plane 10 at the bottom of the lock body 2 extending backward and downwardly from the transverse sliding slope 8, wherein the locating plane is vertical to the horizontal plane, and extends left and right along the lock body 2.

The hook 3 has a groove 6 indenting forward at a rear and middle part of the hook.

The hook 3 has a left longitudinal guiding slope 71 extending leftward and downwardly from a top of the hook, and a right longitudinal guiding slope 72 extending rightward and downwardly from a top of the hook.

The lock body 2 close to the lock base is becoming thinner from the bottom to an upper portion forming a waist cylindrical surface 9, wherein the waist cylindrical surface 9, the transverse sliding slope 8, the locating plane 10 forms a surface at a lower portion of the lock body 2.

The front side and rear side of the lock body 2 project a projecting shadow on the lock base 1.

Figure 22:
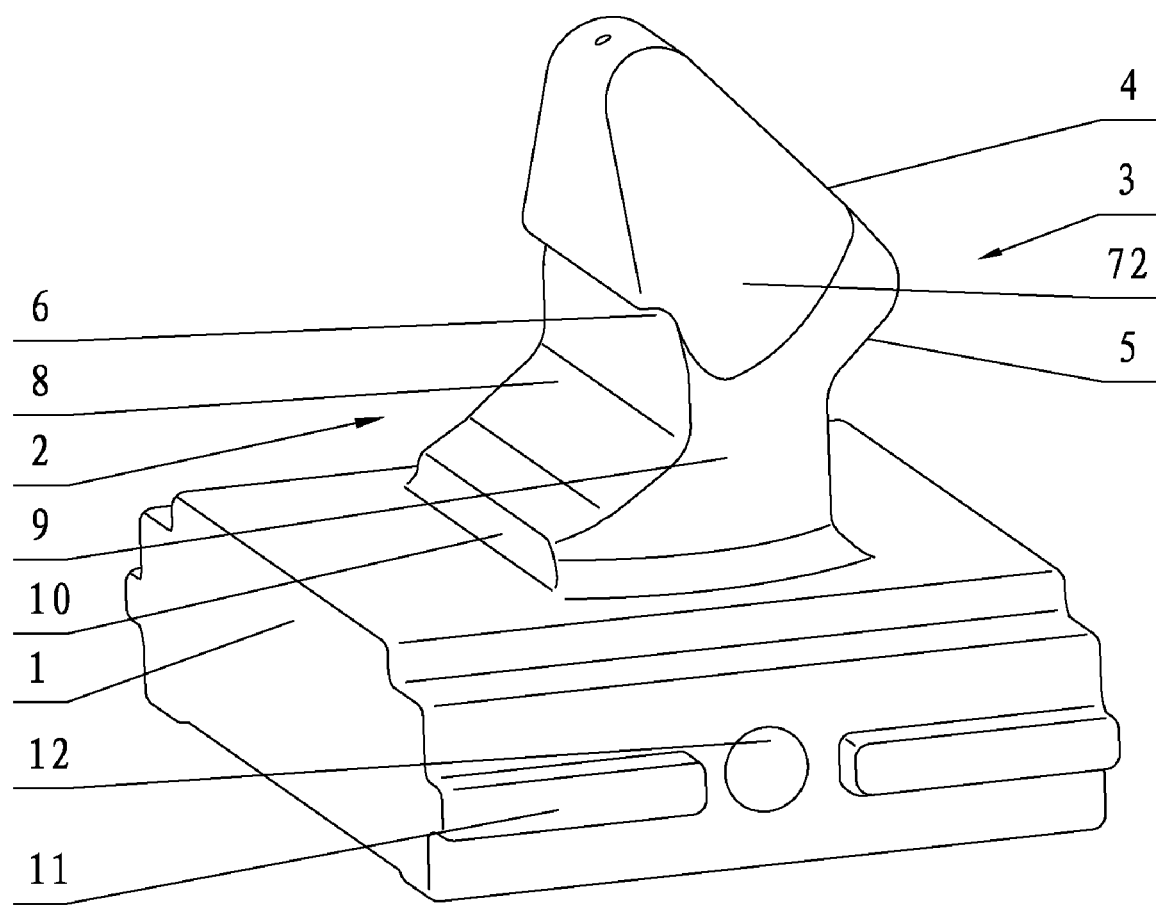
FIG. 22 is a perspective view of another embodiment according to the above preferred embodiment of the present invention.

Referring to FIG. 22 of the drawings, a perspective view of another embodiment of the present invention is illustrated. The front side and rear side of the lock body 2 project a projecting shadow on the lock base 1, and the lock base 1 has a plurality of protruding platforms 11 at a lower portion of the lock base at left and right side of the lock body 2, wherein the protruding platforms 11 extend transversely along the lock body. The lock base 1 further has a locating hole 12 at a lower portion of the lock base and through left and right side of the lock body 2. The protruding platforms 11 and the locating hole 12 are used for locating the lock base 1.

The direction explanation: the front side of the lock body 2 is the direction where the hook facing, and the rear side the lock body 2 is the direction where the hook facing back. The front, left, right, rear side of the lock body is counterclockwise distributed at a top view.

The function of each part is illustrated as follows:

The lock seat 1: for supporting a container.

The hook 3: for hooking the container to avoid an upward shift and a sideturn.

The transverse guiding slope 4: for rotating the container during the falling of the container.

The hooking slope 5: for sliding the container during the lifting of the container to an unlock position.

The groove 6: for hooking the container when the container turns a large angle, so as to prevent a sideturn.

The left longitudinal guiding slope 71 and the right longitudinal guiding slope 72: for guiding the container during the falling of the container.

The transverse sliding slope 8: for sliding the container to a locking position after the container rotates during the falling of the container.

The waist cylindrical surface 9: for preventing a horizontal shift of the container.

The locating plane 10: for resisting the container so as to preventing the horizontal shift and the sideturn of the container.

Figure 6:
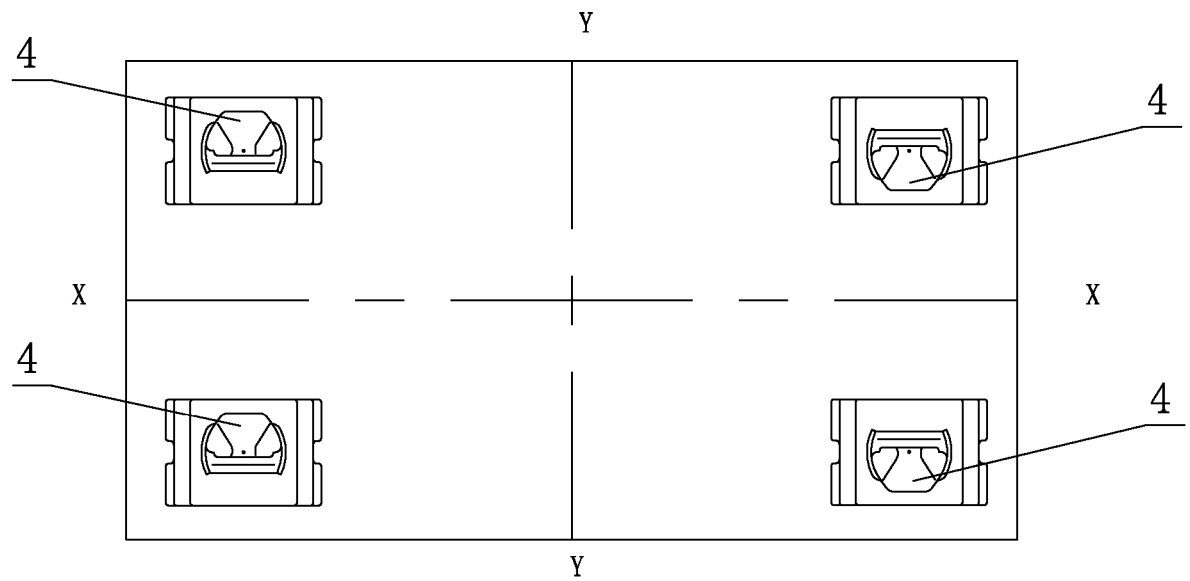
FIG. 6 is a perspective view of an automatic bottom lock according to the above preferred embodiment of the present invention, illustrating a practical application of the present invention.
Figure 7:
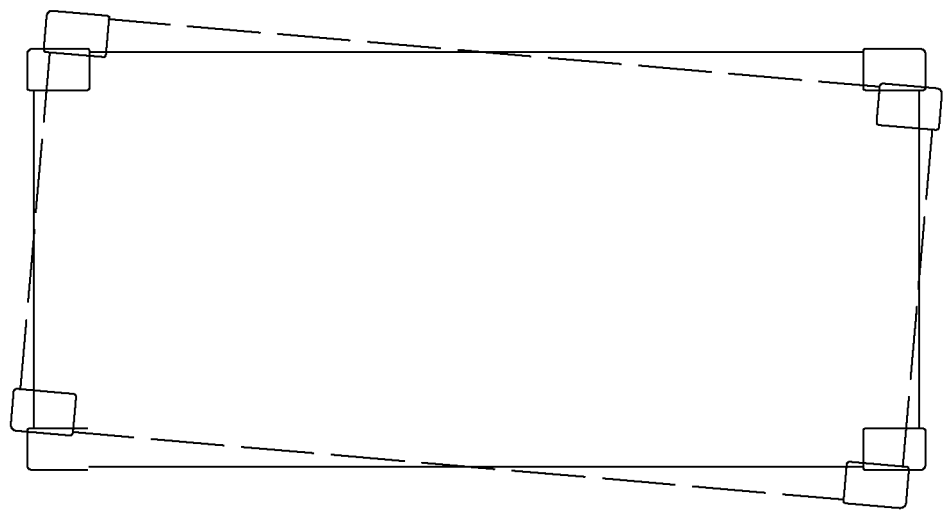
FIG. 7 illustrates a laying and lifting principles of a container in the practical application according to the above preferred embodiment of the present invention.
Figure 8:
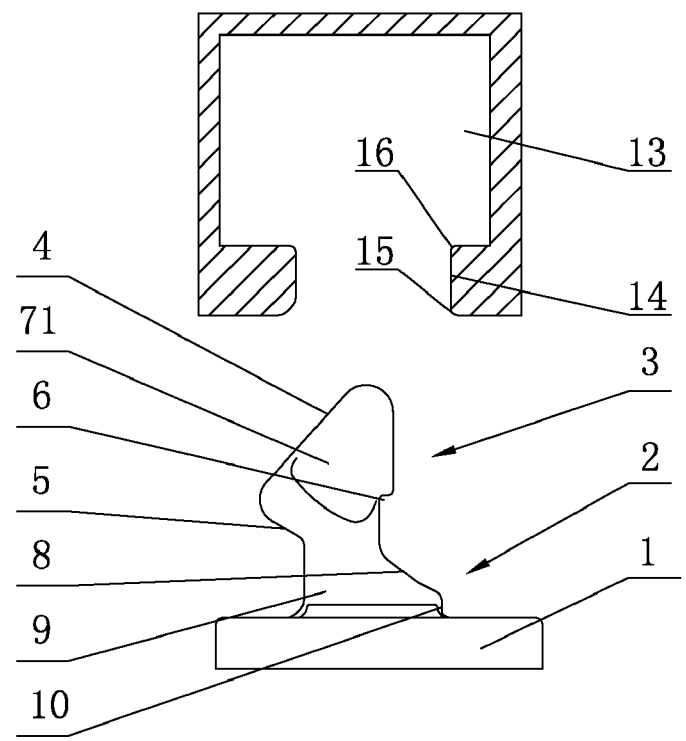
FIG. 8 through FIG. 12 illustrates a laying principle of a container in the practical application according to the above preferred embodiment of the present invention.
Figure 9:
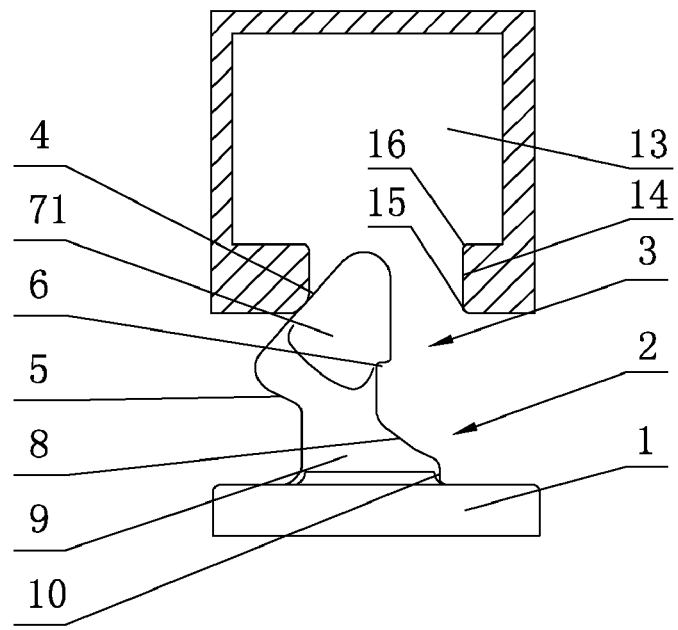
Figure 10:
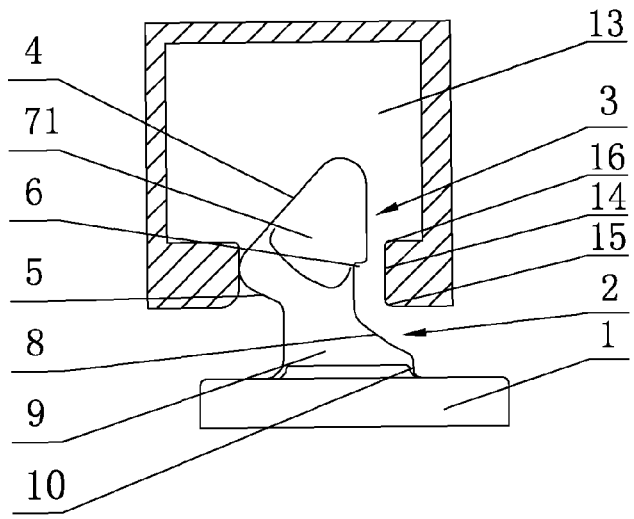
Figure 11:
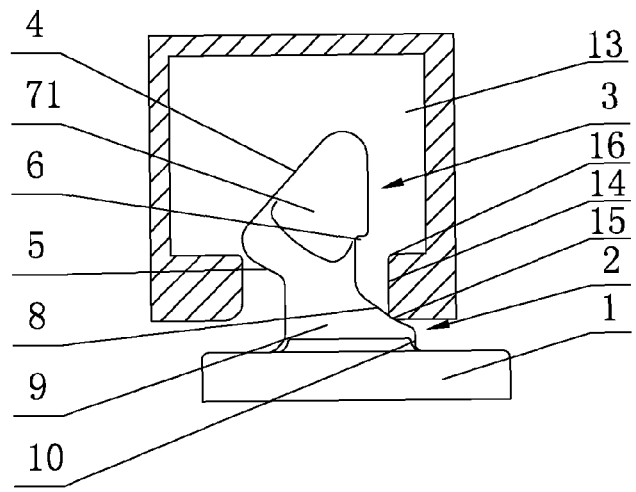
Figure 12:
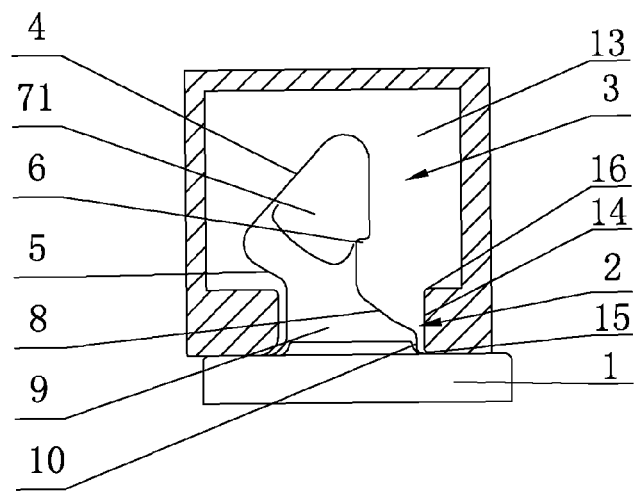
Figure 13:
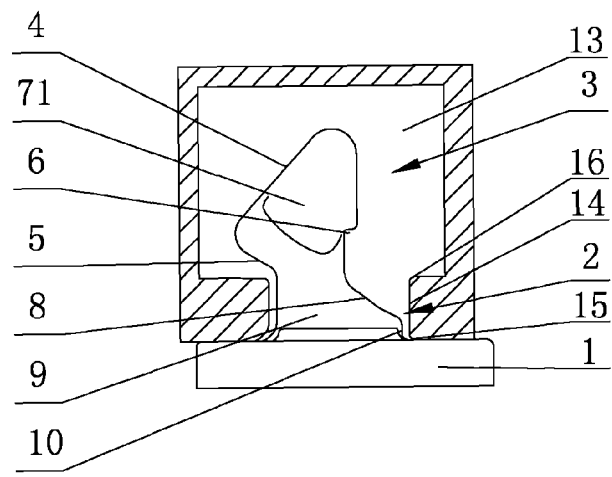
FIG. 13 through FIG. 17 illustrates a lifting principle of a container in the practical application according to the above preferred embodiment of the present invention.
Figure 14:
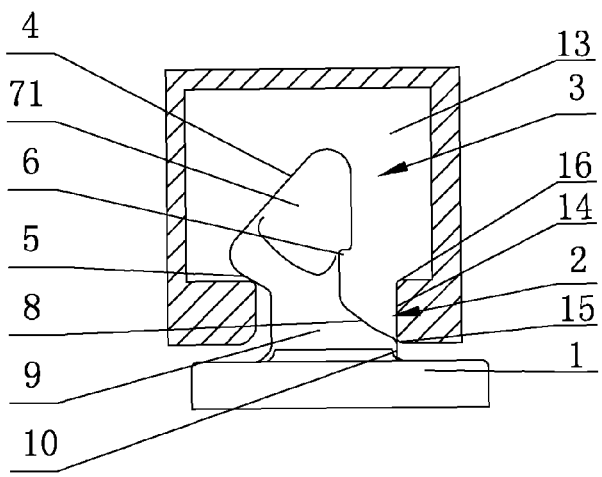
Figure 15:
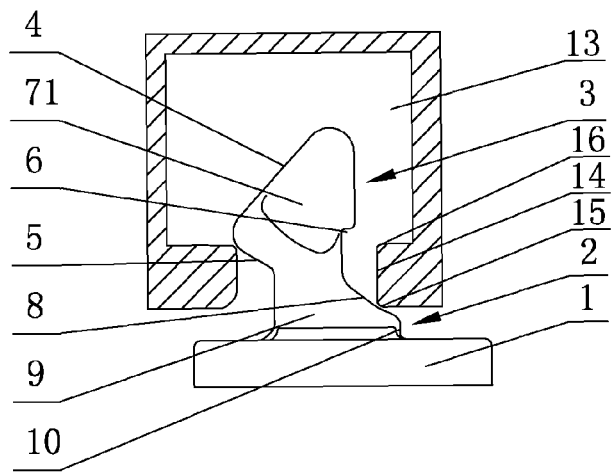
Figure 16:
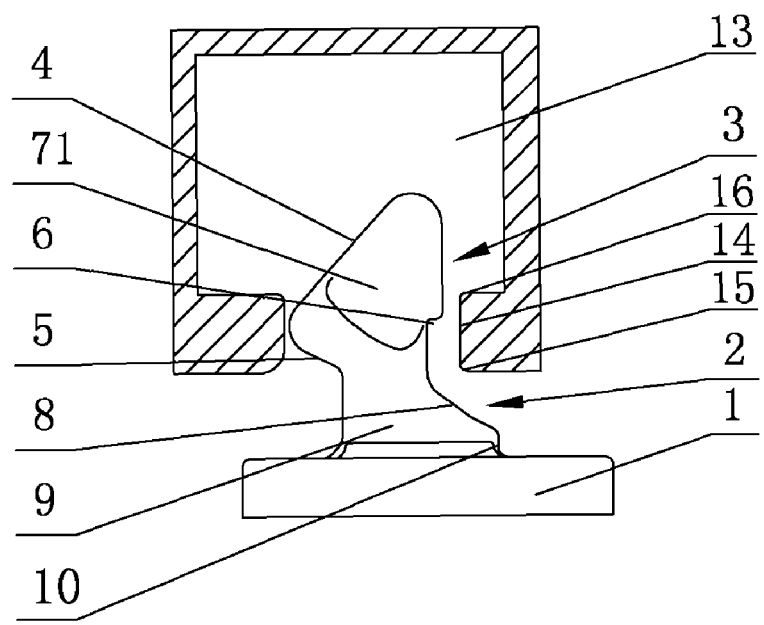
Figure 17:
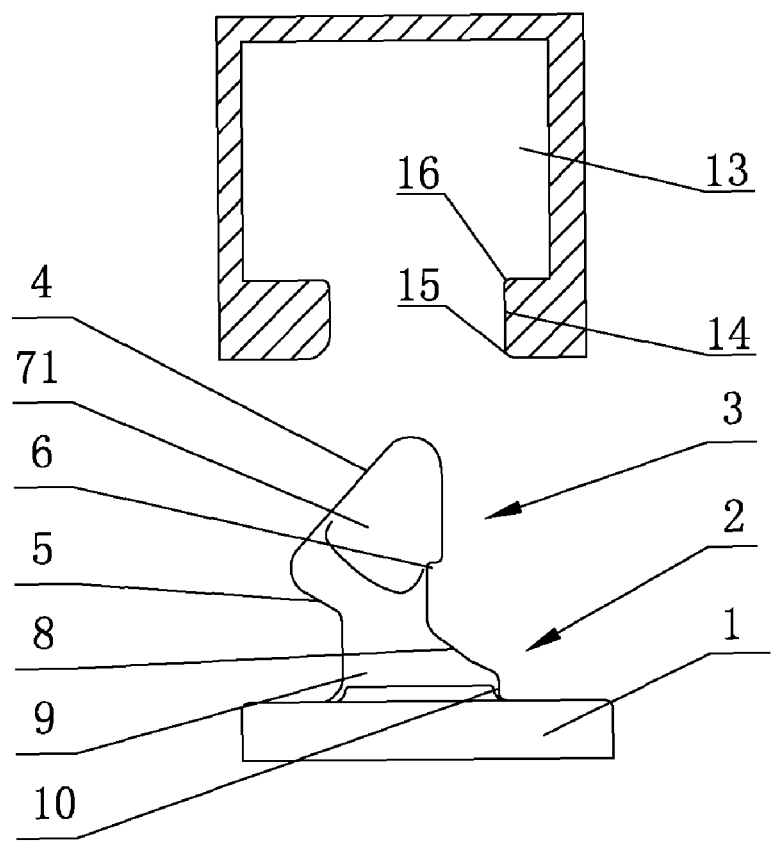

Referring to FIG. 6 of the drawings, four automatic bottom locks of the present invention is mounted on a carrier, such as a train, a truck, or a ship, wherein the four automatic bottom locks are mounted at four corner of the carrier, and symmetrical with respect to a symmetrical plane of the carrier: X-X and Y-Y plane. Two lock tongues 4 at one side of the Y-Y plane extend to one side of the X-X plane; two lock tongues 4 at the other side of the Y-Y plane extend to the other side of the X-X plane. The container should have four corner holes 13 corresponding to the four automatic bottom locks provided at a bottom of the container. When the container connects to the carrier, the corner holes 13 can lock with the automatic bottom locks.

Referring to FIG. 7 and FIG. 8 through FIG. 12 of the drawings, a principle of the locking procedure is illustrated. Firstly, align the corner hole 13 with the automatic bottom lock on the carrier, and lay down the container; secondly, press an outer side 15 having an opening of the corner hole 13 onto the transverse guiding slope 4, so that the container rotates with respect to the carrier, referring to broken line in FIG. 7; thirdly, further lay down the container, and the opening 14 of the corner hole 13 move from an upper portion of the hook 3 to an lower portion of the hook 3, so that the opening of the corner hole 13 is against the transverse sliding slope 8, and the container moves inwardly with respect to the carrier; and fourthly, the container returns to the original angle with respect to the carrier, and the opening 14 of the corner hole 13 sticks by the waist cylindrical surface 9 and the locating plane 10, so as to lock the container and the carrier.

Referring to FIG. 7 and FIG. 13 through FIG. 17 of the drawings, a principle of the lifting procedure is illustrated. Firstly, lift the container, so as to detach the opening 14 of the corner hole 13 with the waist cylindrical surface 9 and the locating plane 10; secondly, the an inner side 15 having an opening of the corner hole 13 is against the hooking slope 5 of the hook, so that the container rotates with respect to the carrier; thirdly, further lifting the container, the opening 14 of the corner hole 13 move from an lower portion of the hook 3 to an upper portion of the hook 3, so that the container and the carrier are unlocked; and fourthly, the container moves inwardly with respect to the carrier; the container returns to the original status.

Figure 18:
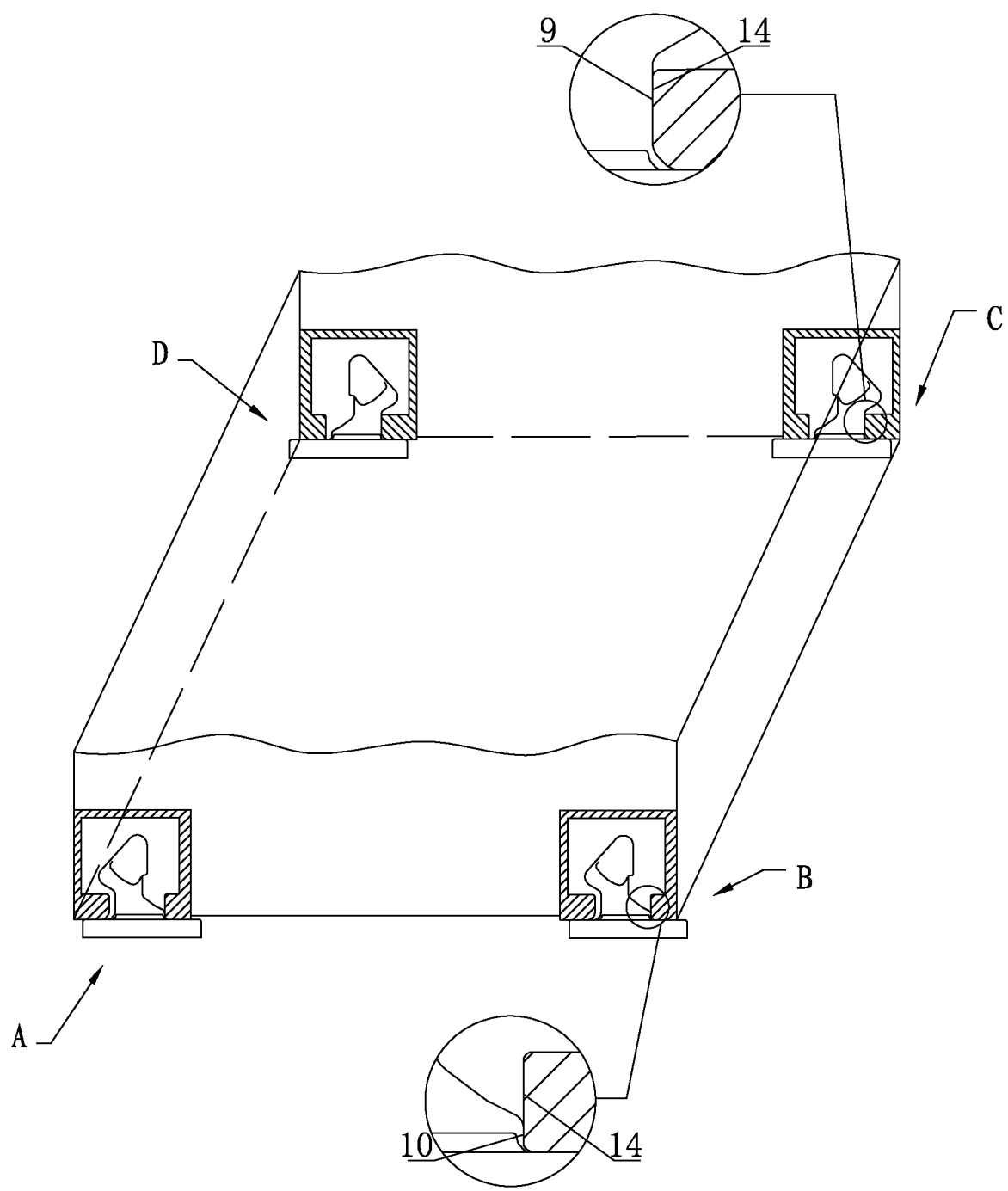
FIG. 18 illustrates a transverse force principle in B-C direction of the practical application according to the above preferred embodiment of the present invention.

A force analysis of the present invention is illustrated as follows:

Referring to FIG. 18 of the drawings, a force analysis of the present invention in a transverse B-C direction is that the locating plane 10 at B place and the waist cylindrical surface 9 at C place retain the opening 14, to prevent the container sliding in a horizontal direction.

Figure 19:
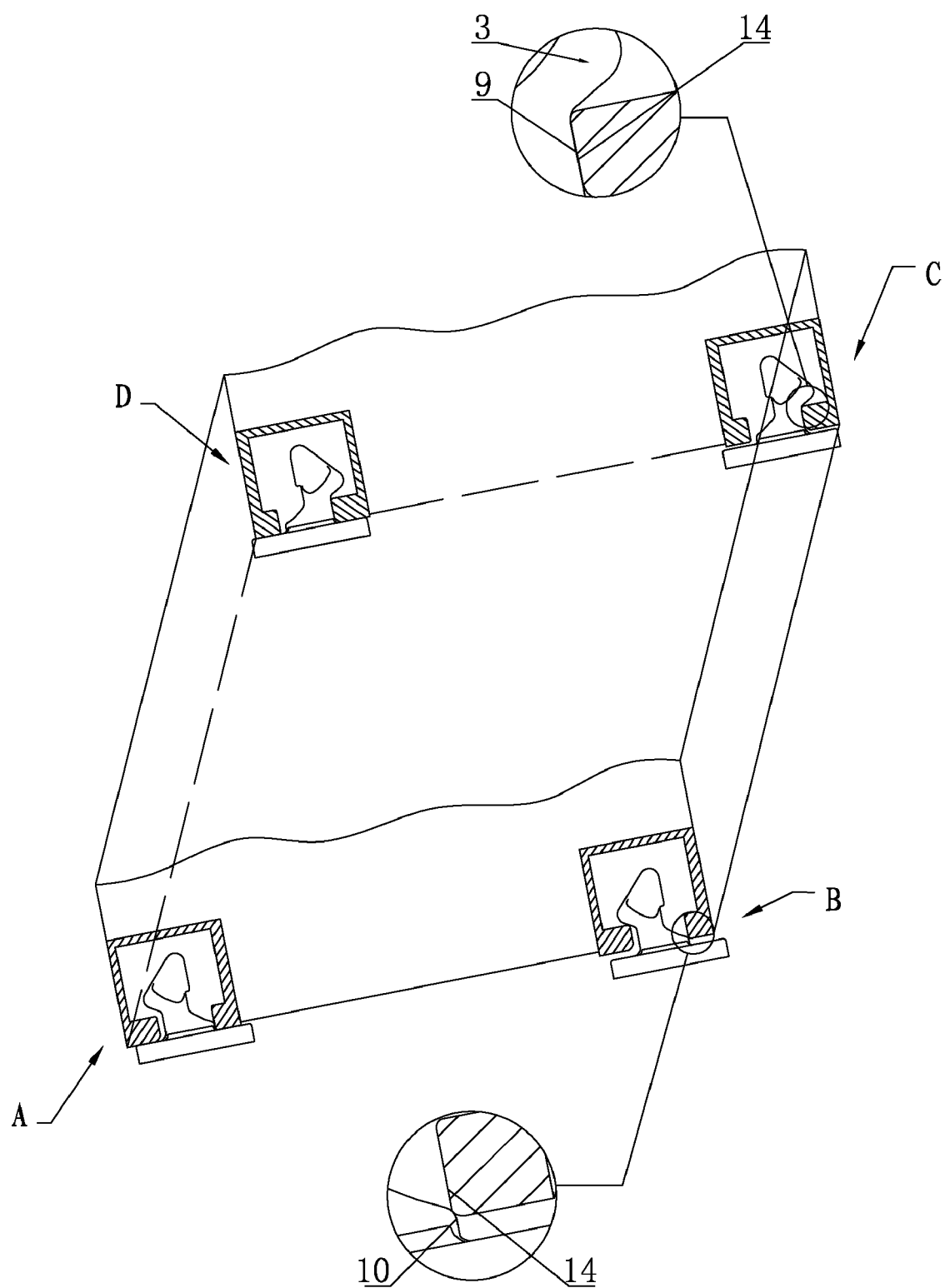
FIG. 19 illustrates a rotating force principle in A-D direction of the practical application according to the above preferred embodiment of the present invention.

Referring to FIG. 19 of the drawings, a rotating force analysis of the present invention in a left A-D direction is that the hook at B place can avoid a upward shift of the opening 14, and the locating plane 10 can avoid a transverse shift of the opening 14; the hook at C place can avoid a upward shift of the opening 14, and the waist cylindrical surface 9 can avoid a transverse shift of the opening 14; the two above work together to avoid a overturn of the container in A-D direction.

Figure 20:
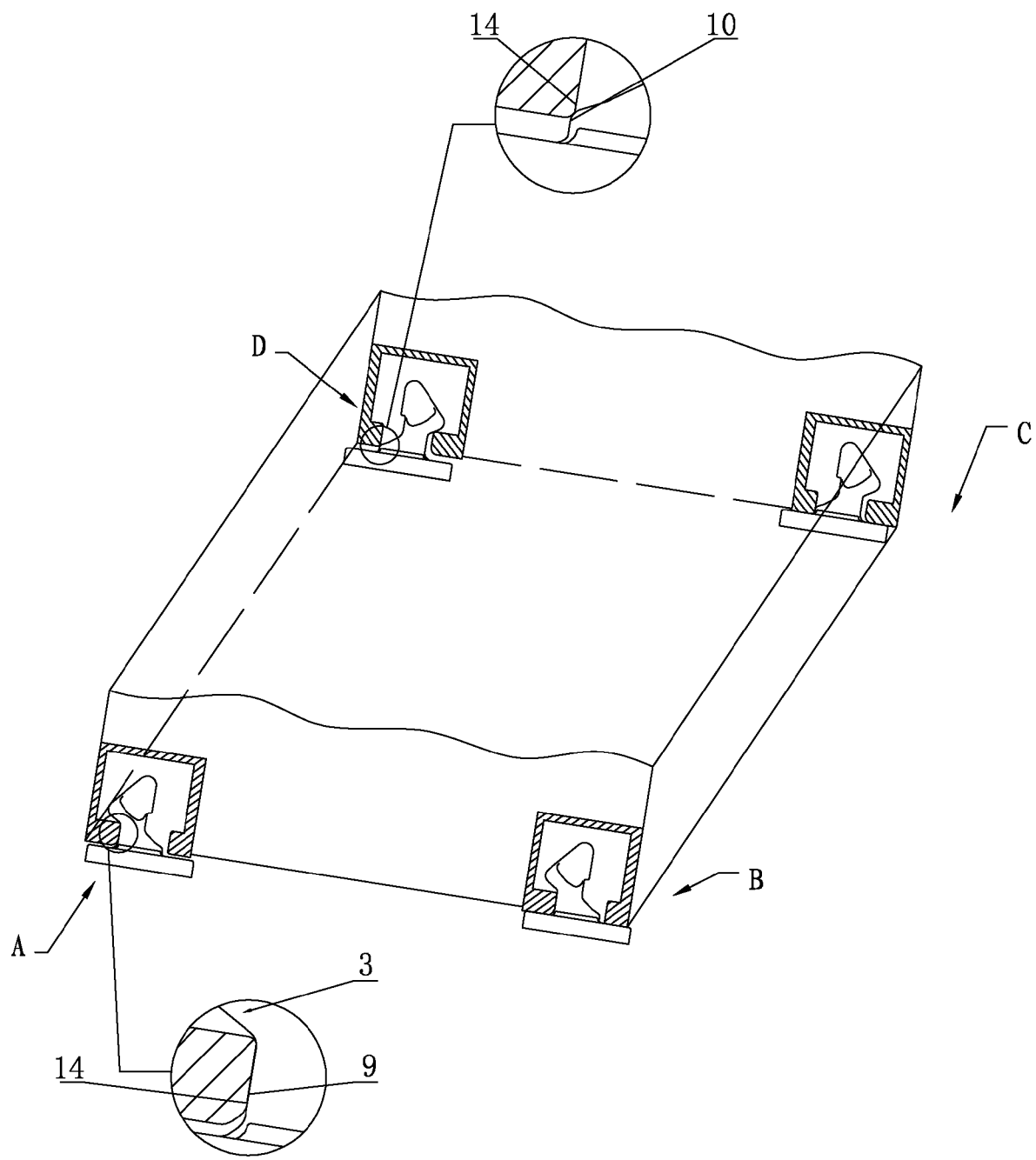
FIG. 20 illustrates a rotating force principle in B-C direction of the practical application according to the above preferred embodiment of the present invention.

Referring to FIG. 20 of the drawings, a rotating force analysis of the present invention in a right B-C direction is that the hook at A place can avoid a upward shift of the opening 14, and the waist cylindrical surface 9 can avoid a transverse shift of the opening 14; the hook at D place can avoid a upward shift of the opening 14, and the locating plane 10 can avoid a transverse shift of the opening 14; the two above work together to avoid a overturn of the container in B-C direction.

Figure 21:
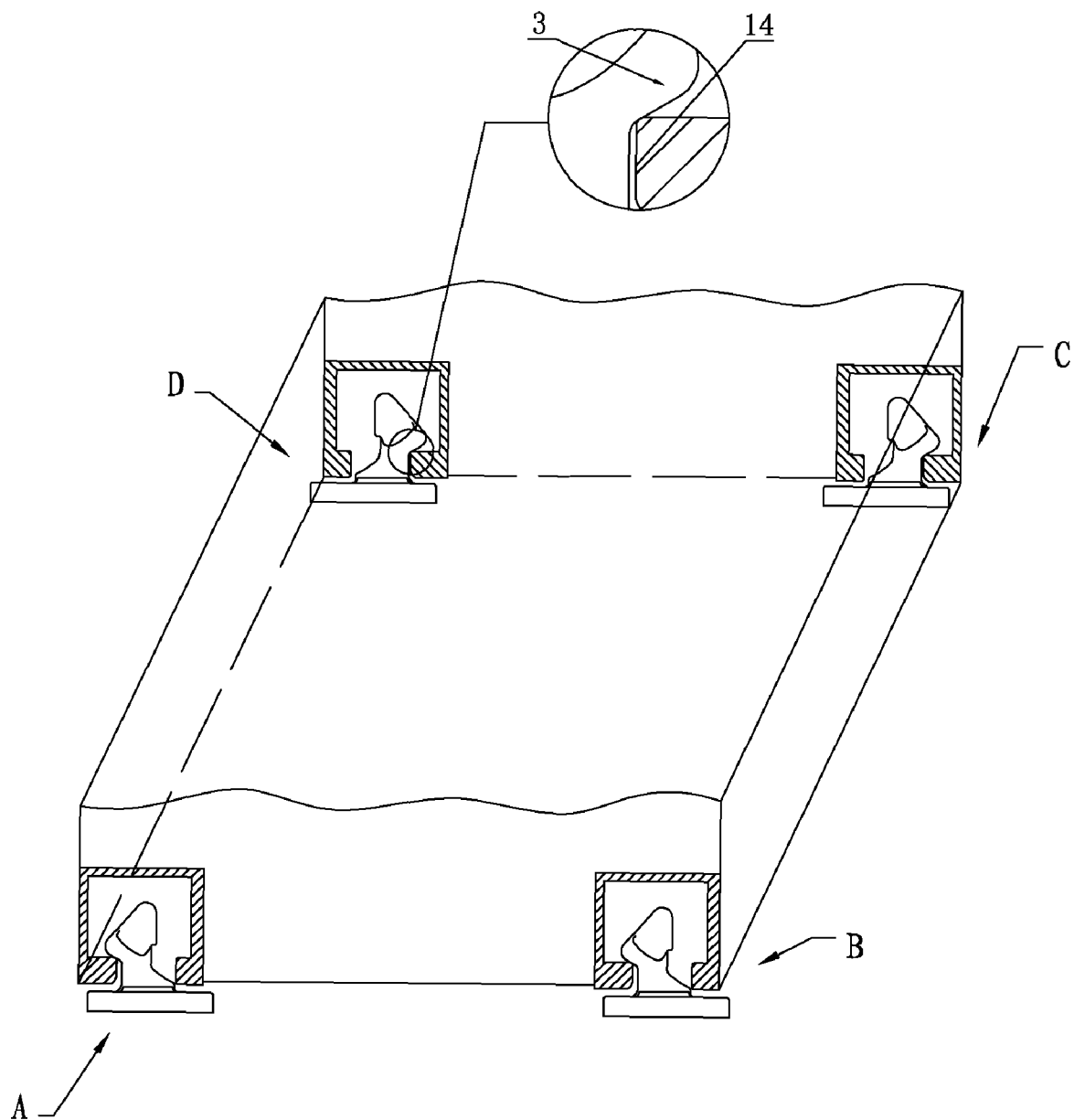
FIG. 21 illustrates an upward force principle of the practical application according to the above preferred embodiment of the present invention.

Referring to FIG. 21 of the drawings, an upward force analysis of the present invention is that the hooks at A, B, C and D place can avoid an upward shift of the opening 14, so as to avoid an upward lift of the container.

In summary, the automatic bottom lock can effectively avoid the horizontal shift, the overturn in left and right direction, and an upward lift of the container. And through testing, these results can be actually achieved during the conveying of the carrier.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An automatic bottom lock for locking a container having a hole at bottom thereof which having an opening, comprising:
    a lock base; and
    a lock body fixedly fastened above said lock base, comprising a hook provided thereon having a transverse guiding slope extending forward and downwardly from a top at a front side of said hook, a hooking slope extending backward and downwardly from a lower end of said transverse guiding slope, a transverse sliding slope extending backward and downwardly from a top at a rear side of said hook, and a locating plane at a bottom of said lock body extending backward and downwardly from said transverse sliding slope, wherein said locating plane is vertical to a horizontal plane, and extends left and right along said lock body,
    wherein when the container is being laid down, said transverse guiding slope and said transverse sliding slope guide the opening to receive said lock body, and then said locating plane retains the container on said lock base; when the container is being lifted up, said hooking slope guides the opening to release said lock body.

2. The automatic bottom lock, as recited in claim 1, wherein said hook has a groove indenting forward at a rear and middle part of said hook.

3. The automatic bottom lock, as recited in claim 1, wherein said hook has a left longitudinal guiding slope extending leftward and downwardly from a top of said hook, and a right longitudinal guiding slope extending rightward and downwardly from a top of said hook.

4. The automatic bottom lock, as recited in claim 2, wherein said hook has a left longitudinal guiding slope extending leftward and downwardly from a top of said hook, and a right longitudinal guiding slope extending rightward and downwardly from a top of said hook.

5. The automatic bottom lock, as recited in claim 1, wherein said lock body close to said lock base is becoming thinner from a bottom to an upper portion.

6. The automatic bottom lock, as recited in claim 4, wherein said lock body close to said lock base is becoming thinner from a bottom to an upper portion.

7. The automatic bottom lock, as recited in claim 1, wherein a front side and rear side of said lock body project a projecting shadow on said lock base.

8. The automatic bottom lock, as recited in claim 6, wherein a front side and rear side of said lock body project a projecting shadow on said lock base.

9. The automatic bottom lock, as recited in claim 7, wherein said lock base has a plurality of protruding platforms at a lower portion of said lock base at left and right side of said lock body, wherein said protruding platforms extend transversely along said lock body.

10. The automatic bottom lock, as recited in claim 8, wherein said lock base has a plurality of protruding platforms at a lower portion of said lock base at left and right side of said lock body, wherein said protruding platforms extend transversely along said lock body.

11. The automatic bottom lock, as recited in claim 9, wherein said lock base further has a locating hole at a lower portion of said lock base and through left and right side of said lock body.

12. The automatic bottom lock, as recited in claim 10, wherein said lock base further has a locating hole at a lower portion of said lock base and through left and right side of said lock body.

13. An automatic bottom lock system for locking a container having four holes provided at four bottom corners thereof, each hole having an opening, comprising a first automatic bottom lock, a second automatic bottom lock, a third automatic bottom lock and a fourth automatic bottom lock respectively corresponding to the four holes, each automatic bottom lock comprising:
    a lock base; and
    a lock body fixedly fastened above said lock base, comprising a hook provided thereon having a transverse guiding slope extending forward and downwardly from a top at a front side of said hook, a hooking slope extending backward and downwardly from a lower end of said transverse guiding slope, a transverse sliding slope extending backward and downwardly from a top at a rear side of said hook, and a locating plane at a bottom of said lock body extending backward and downwardly from said transverse sliding slope, wherein said locating plane is vertical to a horizontal plane, and extends left and right along said lock body,
    wherein said transverse guiding slope of said first automatic bottom lock is facing said hooking slope of said second automatic bottom lock, said transverse guiding slope of said third automatic bottom lock is facing said hooking slope of said fourth automatic bottom lock, wherein said transverse guiding slope of said first automatic bottom lock and said transverse guiding slope of said third automatic bottom lock are facing opposite direction, so as to prevent sideturn of the container,
    wherein when the container is being laid down or lifted up, said first automatic bottom lock and said second automatic bottom lock guide the container to a direction, while the third automatic bottom lock and said fourth automatic bottom lock guide the container to an opposite direction, so as to rotate the container to achieve automatic locking and unlocking.

14. The automatic bottom lock, as recited in claim 13, wherein said hook has a groove indenting forward at a rear and middle part of said hook.

15. The automatic bottom lock, as recited in claim 13, wherein said hook has a left longitudinal guiding slope extending leftward and downwardly from a top of said hook, and a right longitudinal guiding slope extending rightward and downwardly from a top of said hook.

16. The automatic bottom lock, as recited in claim 13, wherein said lock body close to said lock base is becoming thinner from a bottom to an upper portion.

17. The automatic bottom lock, as recited in claim 13, wherein a front side and rear side of said lock body project a projecting shadow on said lock base.

18. The automatic bottom lock, as recited in claim 17, wherein said lock base has a plurality of protruding platforms at a lower portion of said lock base at left and right side of said lock body, wherein said protruding platforms extend transversely along said lock body.

19. The automatic bottom lock, as recited in claim 18, wherein said lock base further has a locating hole at a lower portion of said lock base and through left and right side of said lock body.

* * * * *